Figure 1:
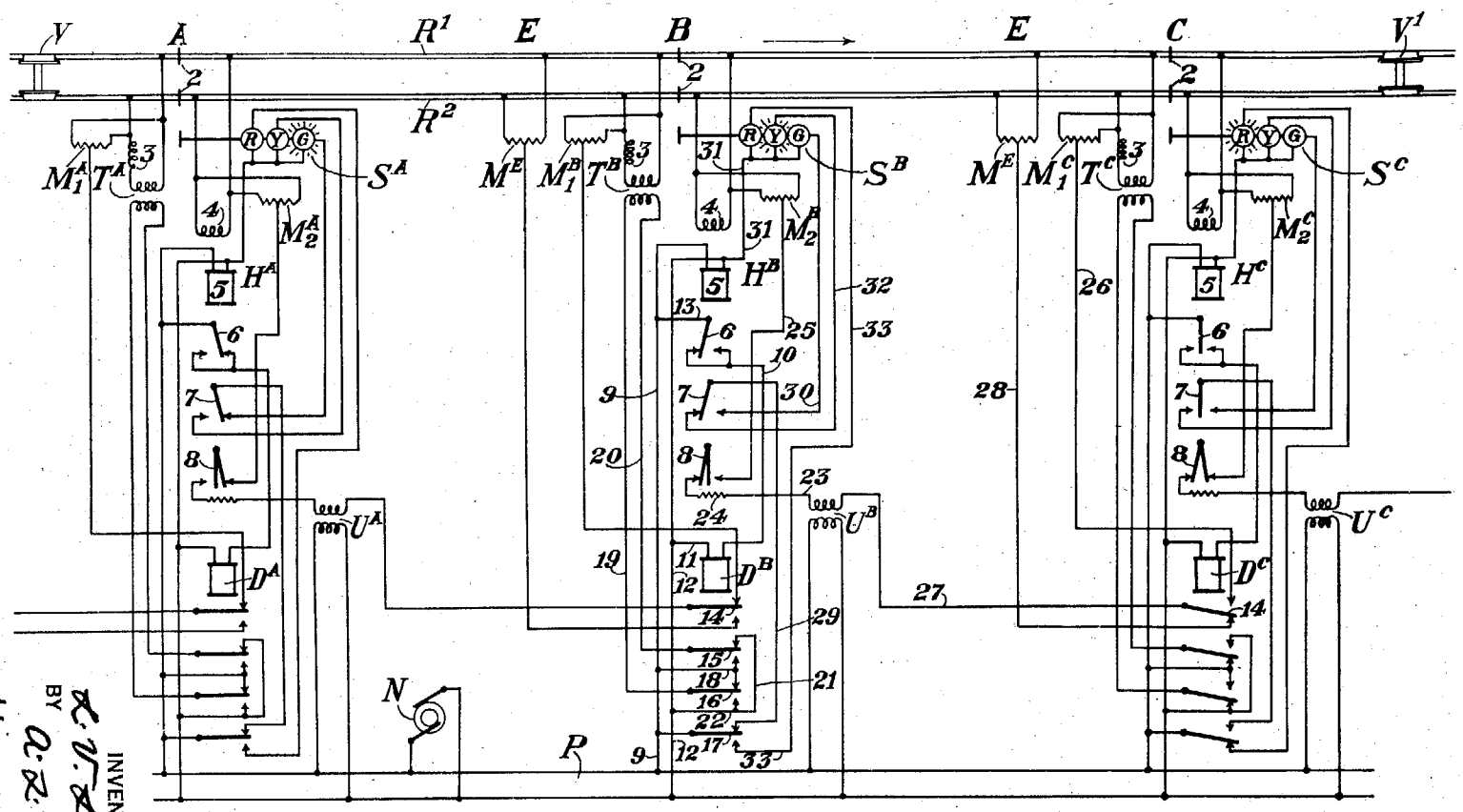

May 1, 1923. Re. 15,592

L. V. LEWIS

RAILWAY TRAFFIC CONTROLLING SYSTEM

Original Filed Nov. 21, 1918 2 Sheets-Sheet 1

INVENTOR:
L. V. Lewis,
BY A. L. Vencill
His ATTORNEY

May 1, 1923. Re. 15,592
L. V. LEWIS
RAILWAY TRAFFIC CONTROLLING SYSTEM
Original Filed Nov. 21, 1918 2 Sheets-Sheet 2
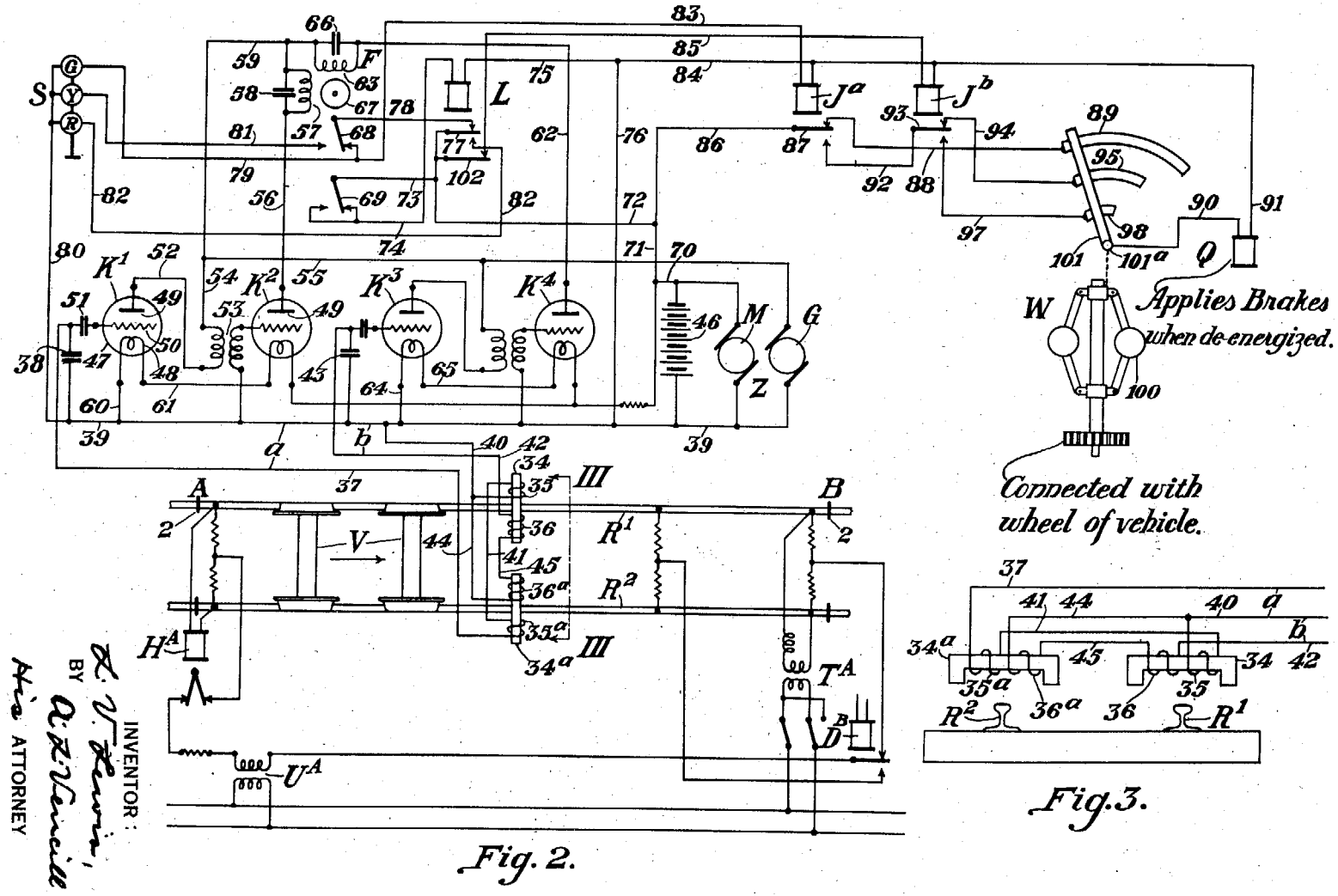
INVENTOR:
L. V. Lewis,
BY
A. L. Vencill
His ATTORNEY Reissued May 1, 1923. Re. 15,592

UNITED STATES PATENT OFFICE.

LLOYD V. LEWIS, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY-TRAFFIC-CONTROLLING SYSTEM.

Original No. 1,351,771, dated September 7, 1920, Serial No. 263,607, filed November 21, 1918. Application for reissue filed April 19, 1922. Serial No. 555,640.

*To all whom it may concern:*

Be it known that I, LLOYD V. LEWIS, a citizen of the United States, residing at Edgewood Borough, in the county of Allegheny and State of Pennsylvania, have invented certain new and useful Improvements in Railway-Traffic-Controlling Systems, of which the following is a specification.

My invention relates to railway traffic controlling systems, and particularly to systems of the type wherein traffic governing means located on a railway car or train is controlled by energy received from the trackway.

I will describe one form of traffic controlling system embodying my invention, and will then point out the novel features thereof in claims.

In the accompanying drawings, Fig. 1 is a diagrammatic view showing one form of trackway apparatus embodying my invention. Fig. 2 is a diagrammatic view showing one form of vehicle-carried apparatus which can be used in co-operation with the trackway apparatus shown in Fig. 1, and also embodying my invention. Fig. 3 is a view taken on the line III—III of Fig. 2 looking in the direction indicated by the arrows.

Similar reference characters refer to similar parts in each of the views.

Referring first to Fig. 1. the reference characters $R'$, $R^2$ designate the track rails of a railway, which rails are divided by insulated joints 2 to form blocks A—B, B—C, etc. Traffic along the railway is normally in the direction indicated by the arrow.

Each block is provided with a track circuit comprising as usual the track rails of the block, a source of alternating signaling current connected across the rails adjacent the exit end of the block, and a track relay having a winding connected across the rails adjacent the entrance end of the block. The source of current for each track circuit is the secondary of a transformer which is designated T with an exponent corresponding to the location, and the relay for each track circuit is designated by the reference character H with an exponent corresponding to the location. For example, the track circuit for block B—C comprises the secondary of transformer $T^C$ and a track winding 4 of track relay $H^B$.

Each track relay H is of a three-position type, comprising the track winding 4 and a second or local winding 5. The track winding is connected directly with the track rails, and the local winding 5 is constantly connected with a transmission line P to which alternating signaling current is supplied by a generator N. Each of these relays, then, responds to reversals of the relative polarity of the current in the corresponding track circuit with respect to that of the transmission line P, so that the contact fingers 6, 7 and 8 are swung to the right when the track circuit is of one polarity (which I will call normal), and to the left when the track circuit is of the other polarity (which I will term reverse). These contact fingers occupy intermediate or vertical positions when the track winding of the relay is deenergized.

The primary of each track transformer T is connected with the transmission line P through the medium of a pole-changer, as hereinafter explained.

Each block is provided with a second relay which is designated by the reference character D with an exponent corresponding to the location of the relay. Each of these relays D is controlled by contact 6 of the track relay H at the same location, the control being such that relay D is energized when the track relay is energized in either direction, but that relay D is de-energized when the track relay is de-energized. For example, the circuit for relay $D^B$ is from the upper wire of transmission line P through wires 9 and 13, contact 6, wire 10, relay $D^B$, and wires 11 and 12 to the lower wire of the transmission line. It will be noted that contact 6 is closed when track relay $H^B$ is energized in either direction.

Each relay D is provided with four contact fingers 14, 15, 16 and 17, the two middle fingers 15 and 16 of which constitute the pole-changing contacts for reversing the polarity of the signaling current supplied to the primary of the adjacent transformer T. For example, when relay $D^B$ is energized, the circuit for the primary of transformer $T^B$ is from the upper wire of the transmission line P, through wires 9 and 18, upper point of contact 16, wire 19, primary of transformer $T^B$, wire 20, upper point of contact 15, wires 21, 22 and 12 to the lower wire of the transmission line P. When relay $D^B$ is de-energized, the circuit for the primary of transformer $T^B$ is from wire 9, through wire 18, lower point of contact 15, wire 20, primary of transformer $T^B$, wire 19, lower point of contact 16 and wire 22 to wire 12. When relay $D^B$ is energized, the current which is supplied to the transformer $T^B$ is of normal polarity, that is, of such polarity that relay $H^A$ is energized in the normal direction. When relay $D^B$ is de-energized, current of reverse polarity is supplied to transformer $T^B$, so that relay $H^A$ is energized in the reverse direction.

It follows from the foregoing, that the track relay H for a block immediately in the rear of an occupied block is energized in the reverse direction, and that the track relay for a block in the rear of the unoccupied block is energized in the normal direction.

Means are provided for each block for supplying a second alternating current thereto, which current flows in the same direction in both rails of the block. This current is supplied by a transformer located at the entrance end of the block and designated by the reference character U with an exponent corresponding to the location. The primary of each of these transformers is connected directly with the transmission line P. This current is led into the track rails through connections at the middle points of resistances which are connected across the rails and which are designated by the reference character M with suitable exponents and subscripts. Three of these resistances are provided for each block, two of which are located at the opposite ends of the block and the third at an intermediate point in the block designated E. The point E in each block is located a distance in the rear of the exit end of the block substantially equal to the maximum braking distance of a train traveling at an "intermediate" speed, which speed, as hereinafter chosen arbitrarily, is 35 miles per hour. Each block is, therefore, divided by the point E into a forward section and a rear section; thus the forward section for block B—C is section E—C, and the rear section is B—E.

The supply of current from each transformer U to the rails of the corresponding block is controlled by contact 8 of the track relay for the same block, and by contact 14 of the relay D for the block next in advance. Contact 8 of each track relay is arranged to be closed when the relay is de-energized, but to be open when the relay is energized in either normal or reverse direction. When relay $D^C$ is energized, and relay $D^B$ de-energized, current from transformer $U^B$ is supplied to the rails of block B—C, the circuit being from the secondary of transformer $U^B$, through wire 23, non-inductive resistance 24, contact 8 of relay $H^B$, wire 25 to the middle point of resistance $M^B_2$; here the current divides and flows through the two halves of this resistance in opposite directions, through rails R′ and $R^2$ in multiple, the two halves of resistance $M^C_1$ in opposite directions to the middle point of this resistance; thence through wire 26, upper point of contact 14 of relay $D^C$, and wire 27 to the secondary of transformer $U^B$. When relay $D^C$ is de-energized, however, the current from transformer $U^B$ passes through wire 23, resistance 24, contact 8, wire 25, resistance $M^B_2$, rails R′ and $R^2$ in multiple to point E, thence through the two halves of resistance $M^E$, wire 28, lower point of contact 14, and wire 27 to transformer $U^B$. It will be seen therefore, that when the relay D for any block is energized, and the block in the rear is occupied, current from the transformer U is supplied to the track rails of the block in the rear throughout the entire length of such block; but that when the relay D for any block is de-energized and the block in the rear is occupied, current from the transformer U is supplied to only the rear section of the block in the rear, that is, from the entrance end of such block to the point E. It will further be seen that current from the transformer U of any block is supplied to the rails of such block only when relay H for such block is de-energized; that is, only when a vehicle has entered the block.

From the foregoing it will be seen that means are provided for each block for supplying two superimposed alternating signaling currents to the rails thereof, one of which currents flows in opposite directions in the two rails, while the other current flows in the same direction along the rails. An inductive reactance 3 is included in the secondary circuit of each transformer T, and a non-inductive resistance 24 is included in the secondary circuit of each transformer U, so that the currents from the two sources are preferably displaced substantially 90° in phase in the track rails. The resultant total current in one rail is, therefore, approximately equal in amplitude, but differs widely in phase from the current in the other rail. Since the local winding 5 and the track winding 4 of the track relay H, which is preferably of the usual induction motor type are inductive, the current through local winding 5 will lag behind the electromotive force of the transmission line, and will require a lag of more than 90° in the current in the track winding 4 to the phase displacement between the currents in the two relay windings required for the most efficient operation of the relay. Non-inductive shunt resistance $M_2$ connected across winding 4 permits the current in the inductive branch circuit 4 to lag a greater amount than the resultant current in the track rails from transformer T, which current, by reason of the reactance of the track rails and the non-inductive shunt resistance M, will lag a greater amount than the total current through reactance 3, which total current will lag behind the electromotive force of the transmission line. That is, by connecting non-inductive resistances M across the track rails the angle of lag of the track circuit current in the track rails and through the track relay may be increased, and within limits may be varied by changing these resistances, so as to secure efficient operation of the track relay and likewise so as to produce a large angle of lag in the track circuit current in an occupied block so as to secure efficient operation of certain vehicle-carried apparatus hereinafter described. As is evident, the leakage conductance between rails may in wet weather produce an effect similar to resistances M, but the presence of resistances M stabilizes this effect and renders the track circuit less variable with changes in weather conditions and secures the advantageous conditions of operation under all weather conditions.

Located at the entrance of each block is a roadside signal which is designated by the reference character S with an exponent corresponding to the location of the signal. As here shown, these signals are of the type known as "light signals", each comprising three electric lamps G, Y and R, indicating "Proceed", "Caution" and "Stop", respectively, when illuminated. Each signal S is controlled by contact 7 of the adjacent track relay H, and by contact 17 of the adjacent relay D. This control is such that when the track relay is energized in the normal direction, the green lamp G is illuminated so that the signal indicates "Proceed"; when the track relay is energized in reverse direction the yellow lamp Y is illuminated so that the signal indicates "Caution"; and when the track relay is de-energized, the red lamp R is illuminated so that the signal indicates "Stop". As here shown, the circuit for the proceed lamp G (see signal $S^B$) is from wire 9, through the upper point of contact 17, wire 29, right-hand point of contact 7, wire 30, lamp G, and wire 31 to wire 12. The circuit for the caution lamp Y is the same as the circuit just traced for lamp G, except that it includes the left-hand point of contact 7 and wire 32. The circuit for the red lamp R is from wire 9, through the lower point of contact 17, wire 33, lamp R, and wire 31 to wire 12.

Referring now to Fig. 2, the reference character V designates a railway vehicle (a car or train), which is represented by two axles and two pairs of wheels. Mounted on this vehicle in advance of the forward axle are two laminated soft iron cores 34 and $34^a$, located over the two track rails respectively (see also Fig. 3), each core being U-shaped with its legs pointing downwardly, and each core being disposed transversely with respect to the rail. It is apparent, therefore, that when alternating current flows in either rail, part of the magnetic lines of force surrounding such rail will pass through the core which is directly over the rail, and so will induce an alternating potential in any coil which the core may carry.

Core 34 is provided with two coils 35 and 36, and core $34^a$ is similarly provided with two coils $35^a$ and $36^a$. Coils 35 and $35^a$ are connected in series in a circuit *a*, which circuit is from coil $35^a$, through wire 37, condenser 38, wires 39 and 40, coil 35 and wire 41 to coil $35^a$. The coils 35 and $35^a$ are connected in this circuit in such manner that the potentials created in these coils by alternating current flowing in opposite directions in the two rails are additive, while the potentials created in these coils by currents flowing in the same direction in the two rails oppose each other and so cause no current in circuit *a*. Track circuit current from transformers T, therefore, induces current in circuit *a*, but the current supplied by transformers U produces no current in this circuit.

Coils 36 and $36^a$ are connected in series in a circuit *b*, which circuit is from coil 36, through wire 42, condenser 43, wires 39, 40 and 44, coil $36^a$, and wire 45 to coil 36. The coils 36 and $36^a$ are connected in this circuit in such manner that the potentials created in these coils by currents flowing in the same direction in the two track rails are additive, but that the potentials created in these coils by currents flowing in opposite directions in the two track rails oppose each other. It follows then, that current from the transformers U flowing in the track rails will induce a current in circuit *b*, but that no current will be induced in this circuit by track circuit current in the rails from the transformers T.

Coils 35 and $35^a$ are so wound as to have high inductance, and condenser 38 has comparatively small capacity, and the circuit including those elements (circuit *a*) is tuned to resonance at the frequency of the signaling current, hence condenser 38 will be charged to a comparatively high potential by the comparatively feeble current induced in circuit *a* by current in the track rails. Circuit *b* is also tuned to resonance at the signaling current frequency, with similar results. It follows that when the vehicle V occupies a block in which signaling currents are supplied to the track rails by transformers T and U, currents will flow in circuits *a* and *b* on the vehicle, and these currents will be of the same frequency as, and will have the same phase displacement as, the two currents in the track rails respectively. These currents, and the consequent potentials impressed on condensers 38 and 43 are, however, too feeble to reliably actuate traffic governing apparatus of a rugged character, hence I preferably provide suitable amplifying apparatus, which, in the form here shown, comprises electron tubes K′, $K^2$, $K^3$, and $K^4$. Each of these electron tubes (see K′) comprises a vacuum tube 47 containing a filament 48, a plate 49, and a grid 50 interposed between the two. The filaments 48 of these electron tubes are constantly heated by a battery 46 through circuits which will be obvious from the drawing.

Condenser 38 of circuit *a* is connected across the filament 48 and grid 50 of electron tube K′, a blocking condenser 51 being included in the circuit. The plate circuit of electron tube K′ is from plate 49, through wire 52, primary of transformer 53, wires 54 and 55, the generator G of a motor generator Z, and wires 39 and 60 to filament 48 of electron tube K′. The motor M of the motor generator Z is constantly operated by the battery 46. The secondary of transformer 53 is connected across the filament and grid of the electron tube $K^2$. The plate circuit of this latter electron tube is from the plate 49, through wire 56, winding 57 of a relay F, wires 59 and 55, generator G, wires 39 and 60, filament of electron tube K′, and wire 61 to filament of electron tube $K^2$. Connected across relay winding 57 is a condenser 58, the circuit comprising condenser 58 and winding 57 being tuned to resonance at the frequency of the signaling current. It will be seen, therefore, that relay winding 57 is supplied with current of the same frequency as that which is supplied to the track circuit, but that this current is of considerably greater magnitude than that induced in circuit *a* and so is of sufficient value to reliably actuate an electromagnetic or induction motor relay of rugged design.

The current induced in the vehicle-carried circuit *b* is similarly amplified by the two electron tubes $K^3$ and $K^4$, the plate circuit of the latter electron tube being from the plate of the electron tube through wire 62, winding 63 of relay F, wires 59 and 55, generator G, wires 39 and 64, filament of electron tube $K^3$, and wire 65 to the filament of electron tube $K^4$. Connected across relay winding 63 is a condenser 66, the circuit including this winding and condenser being tuned to resonance at the frequency of the signaling current. Winding 63 is, therefore, supplied with current of the same frequency as the current supplied to the track rails by the transformers U, but the current in winding 63 is, of course, of considerably greater magnitude than that which flows in circuit *b*.

The relay F is of the induction motor type, comprising a rotor member 67, which responds to currents displaced in phase in the windings 57 and 63, and which, in turn, actuates contact members 68 and 69. Inasmuch as the two currents in the track rails are displaced in phase, it follows that the currents in relay windings 57 and 63 will similarly be displaced in phase, so that torque will be exerted on the rotor member 67 in one direction or the other, depending on the relative instantaneous polarities of the currents in the track rails. In other words, contact members 68 and 69 will be swung to the right or the left from their middle position to which they are biased, according as the track circuit current from transformer T is of normal or reverse polarity.

Relay F controls a relay L in such manner that the latter relay is energized when relay F is energized in either direction, and that relay L is deenergized when relay F is de-energized. The circuit for relay L is from battery 46, through wires 70, 71, 72 and 73, contact 69 of relay F, wire 74, relay L, and wires 75, 76 and 39 to battery 46.

The relays F and L may be employed to control any kind of traffic governing apparatus that may be desired. As here shown, these relays control a cab signal S and speed controlling apparatus W, which two devices I will now describe.

The signal S comprises three incandescent lamps G, Y and R, which lamps, when illuminated, indicate "Proceed," "Caution" and "Stop," respectively. The control of this signal is such that when relay F is energized in the normal direction, lamp G is illuminated so that the signal indicates "Proceed"; when relay F is energized in the reverse direction, lamp Y is illuminated so that the signal indicates "Caution"; and when relay F is de-energized lamp R is illuminated so that the signal indicates "Stop" The circuit for lamp G is from battery 46, through wires 70, 71 and 72, upper point of contact 77 of relay L, wire 78, right-hand point of contact 68, wire 79, lamp G, and wires 80 and 39 to battery 46. The circuit for the caution lamp Y, is the same, except that it includes the left-hand point of contact 68 and wire 81. The circuit for lamp R is from battery 46, through wires 70, 71 and 72, lower point of contact 77, wire 82, lamp R and wires 80 and 39 to battery 46.

The speed controlling apparatus W is governed by two relays $J^a$ and $J^b$, which relays are in turn controlled by relays F and L, in such manner that when relay F is energized in the normal direction relays $J^a$ and $J^b$ are both energized; that when relay F is energized in the reverse direction relay $J^b$ is energized but relay $J^a$ is de-energized; but that when relay F is de-energized, both relays $J^a$ and $J^b$ are de-energized. The circuit for relay $J^a$ is from battery 46, through wires 70, 71, and 72, upper point of contact 77 of relay L, wire 78, right-hand point of contact 68 of relay F, wire 83, relay $J^a$, and wires 84, 76 and 39 to battery 46. The circuit for relay $J^b$ is from battery 46, through wires 70, 71 and 72, contact 102 of relay L, wire 85, relay $J^b$, and wires 84, 76 and 39 to battery 46.

Operatively connected with the wheel or axle of the vehicle is a centrifugal device 100 which in turn controls a contact arm 101 in such manner that the position of this arm varies in accordance with variations in the speed of the vehicle; that is, when the vehicle is at rest, the arm occupies the position in which it is shown, and as the speed of the vehicle increases, this arm swings to the right around its pivotal point $101^a$. This contact arm 101 co-operates with fixed contact segments 89, 95 and 98, which are included in circuits which are controlled by the contacts of relay $J^a$ and $J^b$. These circuits control a brake application magnet Q, which magnet governs the brakes in such manner that the brakes are applied when the magnet is de-energized. When relay $J^a$ is energized, the circuit for magnet Q is from battery 46, through wires 70, 71 and 86, upper point of contact 87, wire 88, contact segment 89, contact arm 101, wire 90, magnet Q, wires 91, 84, 76 and 39 to battery 46. This condition of relay $J^a$ corresponds to the "Proceed" condition of the vehicle governing apparatus, and hence the length of contact segment 89 is such that the vehicle may proceed at a predetermined high speed, such as 65 miles per hour, without causing arm 101 to leave this segment. When relay $J^a$ becomes de-energized, and relay $J^b$ remains energized, the circuit for magnet Q includes the lower point of contact 87 of relay $J^a$, wire 92, the upper point of contact 93 of relay $J^b$, wire 94, and contact segment 95. This condition of the relays corresponds to the "Caution" condition of the vehicle governing apparatus, hence the length of contact segment 95 is such that if the speed of the vehicle exceeds an intermediate value, such as 35 miles per hour, contact arm 101 will leave this segment, so that the magnet Q will become de-energized and will cause an application of the brakes. When both relays $J^a$ and $J^b$ are de-energized, this being the "Stop" condition of the apparatus, the circuit for magnet Q includes the lower point of contact 87, wire 92, the lower point of contact 93, wire 97, and the short segment 98. The length of this segment is such that if the vehicle exceeds a low speed, such as 15 miles per hour, contact arm 101 will swing away from segment 98, and so cause de-energization of magnet Q. Although I have shown a simple magnet Q for controlling the application of the brakes, it is understood that I do not desire to limit myself to such a device; in practical embodiments of my invention it is probable that other apparatus more complicated in nature will be controlled by the contacts of relays $J^a$ and $J^b$, and by the contact segments 89, 95 and 98, which apparatus will in turn control the brakes of the vehicle in such manner as to reproduce the conditions known as "Release," "Application" and "Lap."

The operation of the entire apparatus is as follows:

In Fig. 1 the block immediately in advance of location C is occupied by a vehicle V, so that relay $H^C$ is de-energized. Signaling current of reverse polarity is consequently, supplied to the track rails of block B—C, and if contact 8 of relay $H^B$ were closed, current would be supplied from transformer $U^B$ to the rear section of block B—C, but not to the forward section of this block. Block B—C being unoccupied, the track relay $H^B$ for this block is energized in reverse direction, so that relay $D^B$ is energized. Current of normal polarity is, therefore, supplied to the rails of block A—B by transformer $T^B$, and if contact 8 of relay A were closed, current would be supplied to the rails of block A—B from transformer $U^A$ throughout the entire length of this block. Inasmuch as the track circuit current supplied to the rails of block A—B is of normal polarity it follows that track relay $H^A$ is energized in the normal direction.

The indications given by the fixed trackway signals $S^A$, $S^B$ and $S^C$, and the reasons for these indications will be apparent without explanation.

I will now assume that a vehicle V, shown in the rear of location A, is equipped with the apparatus shown in Figs. 2 and 3, and that this vehicle proceeds in the direction indicated by the arrow through blocks A—B and B—C. As the vehicle V enters the block A—B, circuit *a* will receive current of normal polarity and circuit *b* will receive current from transformer $U^A$. Relay F will, consequently, be energized in the normal direction so that signal S will indicate "Proceed" and the traffic governing apparatus W will permit the vehicle to proceed at high speed. As the vehicle V enters the forward section E—B of this block, no change will occur because current from transformer $U^A$ is supplied to the rails of this section as well as to the rails of section A—E. When the vehicle V passes into block B—C, circuit *b* will receive current from transformer $U^B$, but the current supplied to circuit *a* will be of reverse polarity, so that relay F will become energized in the reverse direction. Signal S will then indicate "Caution" and the traffic governing apparatus W will cause the speed of the vehicle to be brought down to the intermediate value, such as 35 miles per hour, whereupon the vehicle may then proceed at or below this speed. When the vehicle passes point E in this block, the supply of current to circuit *b* will be discontinued, so that relay F will become de-energized. Signal S will then change to "Stop" indication and the governing apparatus W will cause the speed of the vehicle to be reduced to 15 miles per hour, whereupon the vehicle may then proceed at or below this speed. As the vehicle V passes location C, the supply of current to circuit *a* will be discontinued, because the track circuit current will be cut off by the wheels and axles of the vehicle V′ in the same block in advance of vehicle V, so that even though current will then be supplied to circuit *b*, relay F will continue to be de-energized and the conditions of signal S and governing apparatus W will not be changed.

Where, in the accompanying claims, I have used the expression "proceed influence," I mean an influence so characterized that it affects the receiving apparatus on a vehicle in such manner as to give a proceed or full-speed indication on the vehicle. Similarly, the expression "caution influence" means an influence so characterized as to cause a caution or medium speed indication on the vehicle, and the expression "stop influence" means an influence so characterized as to give a stop or low speed indication on the vehicle.

Although I have herein shown and described only one form of apparatus embodying my invention, it is understood that various changes and modifications may be made therein within the scope of the appended claims without departing from the spirit and scope of my invention.

Having thus described my invention, what I claim is:

1. Railway traffic controlling apparatus comprising track rails, a source of alternating signaling current connected across said rails, two non-inductive resistances connected across said rails at different points, a second source of alternating signaling current the terminals of which are connected with the middle points of said resistances, and vehicle-carried traffic governing means controlled by the two currents in said track rails.

2. Railway traffic controlling apparatus comprising track rails, a source of alternating signaling current connected across said rails, two non-inductive resistances connected across said rails at different points, a second source of alternating signaling current the terminals of which are connected with the middle points of said resistances, means responsive to traffic conditions in advance for reversing the polarity of one of said sources, and vehicle-carried traffic governing means controlled by the two currents in said track rails.

3. Railway traffic controlling apparatus comprising track rails, a source of alternating signaling current connected across said rails through an inductive reactance, two non-inductive resistances connected across said rails at different points, a second source of alternating signaling current connected with the middle points of said resistances through a third non-inductive resistance and vehicle-carried traffic governing means controlled by the currents flowing in the track rails.

4. Railway traffic controlling apparatus comprising track rails, a source of alternating signaling current connected across said rails through an impedance, two non-inductive resistances connected across said rails at different points, a second source of alternating signaling current connected with the middle points of said resistances through a third non-inductive resistance, and vehicle-carried traffic governing means controlled by the currents flowing in the track rails.

5. Railway traffic controlling apparatus comprising track rails, two non-inductive resistances connected across said rails at different points, a source of alternating signaling currents the terminals of which are connected with the middle points of said resistances, and vehicle-carried traffic governing means controlled by the current flowing in the track rails from said source.

6. Railway traffic controlling apparatus comprising a railway track divided into blocks, a source of alternating signaling current connected across the track rails of each block adjacent the exit end thereof, means for each block controlled by traffic conditions in advance for reversing the polarity of said source; three resistances for each block connected across the rails thereof at respectively the entrance end, the exit end and an intermediate point in the block, a second source of alternating signaling current for each block one terminal of which is connected with the middle point of the resistance at the entrance end of the block, means for each block controlled by traffic conditions in advance for connecting the other terminal of the second source with the middle point of the resistance at the exit end or with the middle point of the resistance at the intermediate point in the block, and vehicle-carried traffic governing means controlled by the two currents in the track rails.

7. Railway traffic controlling apparatus comprising a railway track divided into blocks, means for each block controlled by traffic conditions in advance for applying an alternating difference of potential of one polarity or the other across the rails adjacent the exit end of the block, means for each block controlled also by traffic conditions in advance for applying a second alternating difference of potential along the rails from the entrance end of the block to an intermediate point in the block or to the exit end of the block, and vehicle-carried brake governing means controlled by the two currents in said track rails.

8. Railway traffic controlling apparatus comprising a railway track divided into blocks, two sources of alternating signaling current for each block, means for each block controlled by traffic conditions in advance for connecting the terminals of one source across the rails at the exit end of the block in one direction or the other, means for each block for connecting one terminal of the other source with both rails at the entrance end of the block, means for each block controlled by traffic conditions in advance for connecting the remaining terminal of the latter source with both track rails at an intermediate point in the block or at the exit end of the block, and vehicle-carried traffic governing means controlled by the two currents in said track rails.

9. Railway traffic controlling apparatus comprising a railway track divided into blocks, a first source of alternating signaling current for each block connected across the track rails at the exit end of the block, a track relay for each block connected across the rails at the exit end of the block and responsive to reversals of polarity of the said first source of current for the same block, a second relay for each block controlled by the track relay for the same block and arranged to be energized when the track relay is de-energized, the contacts of said second relay for each block constituting a pole-changer for the said first source of current for the block next in the rear, a second source of current for each block, means for each block for connecting one terminal of said second source with both track rails adjacent the entrance end of the block, means for each block for connecting the remaining terminal of the second source with both rails adjacent the exit end of the block or at an intermediate point in the block according as the second relay for the block next in advance is energized or de-energized, and vehicle-carried traffic governing means controlled by the two currents in said track rails.

10. Railway traffic controlling apparatus comprising track rails, means for supplying two alternating signaling currents thereto one of which flows in opposite directions in the two rails and the other of which flows in the same direction in the two rails, a vehicle, two soft iron cores thereon located over the two rails respectively and disposed transversely with respect to the rails; a circuit on the vehicle including a coil on each of said cores which coils are so connected in the circuit that the potentials induced in said coils by currents flowing in the same direction in said rails are additive, a second circuit on the vehicle including another coil on each core which coils are so connected in the circuit that the potentials induced in the coils by currents flowing in opposite directions in the track rails are additive, and vehicle governing means controlled by the currents in said two circuits.

11. Railway traffic controlling apparatus comprising track rails, means for supplying alternating signaling current thereto whereby the current in one rail differs in phase from the current in the other rail, a vehicle, two laminated iron cores thereon located respectively over the two rails and disposed transversely with respect to the rails; a circuit on the vehicle including a coil on each of said cores connected in the same direction, a second circuit on the vehicle including a second coil on each core connected in opposite directions, and vehicle governing means controlled by the potentials induced in said two circuits by the current in the two track rails.

12. In combination, a section of railway track, a track circuit including a source of current and a track relay both of which are connected across the rails of said section, a second circuit including the two rails of said section in multiple, and means comprising a contact of said track relay for opening said second circuit when the relay is energized.

13. Railway traffic controlling apparatus comprising means for supplying a plurality of alternating currents to the track rails, means controlled by traffic conditions in advance for reversing the relative polarity of one of said currents under caution conditions, and for discontinuing the supply of one of said currents under stop conditions, and vehicle carried apparatus requiring a constant supply of energy from the track rails to prevent a brake application, said apparatus being responsive to the reversal of relative polarity of said one current by applying the brakes if the speed is above a given medium value, and to the cessation of one of said currents by applying the brakes if the speed of the vehicle is above a given low value.

14. In combination, a railway track divided into blocks, means associated with each block for imparting a proceed influence to a vehicle throughout the length of the block under safe traffic conditions in advance, said means operating under unsafe traffic conditions to impart a caution influence to a vehicle through a portion of the block and a stop influence through the remainder of the block, and means on a vehicle controlled by said influences for governing the brakes.

15. In combination, a railway track divided into blocks, means associated with each block for imparting a proceed influence to a vehicle throughout the length of the block under safe traffic conditions in advance, said means operating under unsafe traffic conditions to impart a caution influence to a vehicle through a portion of the block and a stop influence through the remainder of the block, and means on a vehicle and responding to the caution influence by applying the brakes if the speed of the vehicle is above a given value and to the stop influence by applying the brakes if the speed is above a second and lower value.

16. In combination, a railway track divided into blocks, means associated with each block for imparting a proceed influence to a vehicle throughout the length of the block under safe traffic conditions in advance, said means operating under unsafe traffic conditions to impart a caution influence to a vehicle through a portion of the block and a stop influence through the remainder of the block, and means on a vehicle responsive to said three influences by establishing three fixed speed limits.

17. Railway traffic controlling apparatus comprising track rails, means for impressing thereon two alternating currents of the same frequency but differing in phase, a vehicle provided with means for inductively receiving voltages due to said rail currents, and apparatus on said vehicle controlled by said voltages for automatically governing the speed of the vehicle.

18. Railway traffic controlling apparatus comprising track rails, means for impressing thereon two alternating currents of the same frequency but differing in phase, a vehicle provided with means for inductively receiving voltages due to said rail currents, and apparatus controlled by said voltages for governing the brakes of the vehicle.

19. Railway traffic controlling apparatus comprising track rails, means for impressing thereon two alternating currents of the same frequency but differing in phase, a vehicle provided with means for inductively receiving voltages due to said rail currents, and apparatus controlled jointly by the speed of the vehicle and by said voltages for governing said vehicle.

20. Railway traffic controlling apparatus comprising track rails, means for impressing thereon two alternating currents of the same frequency but differing in phase, a vehicle provided with means for inductively receiving voltages due to said rail currents, a relay on said vehicle having two windings, means interposed between said receiving means and said relay for supplying said windings with alternating potentials having the same phase relation as that of said induced voltages but of greater amplitude, and apparatus controlled by said relay for automatically governing said vehicle.

21. Railway traffic controlling apparatus comprising track rails, means for impressing thereon two alternating currents of the same frequency but differing in phase, a vehicle provided with means for inductively receiving voltages due to said rail currents, amplifying means on said vehicle controlled by said induced voltages, and apparatus on the vehicle controlled by said amplifying means for automatically governing the speed of the vehicle.

22. Railway traffic controlling apparatus comprising track rails, means for impressing thereon two alternating currents of the same frequency but differing in phase, a vehicle provided with means for inductively receiving voltages due to said rail currents, amplifying means on said vehicle controlled by said induced voltages, and apparatus controlled jointly by said amplifying means and the speed of the vehicle for governing said vehicle.

23. The method of governing railway traffic which consists in supplying to the track rails two alternating currents one of which flows in opposite directions in the two rails and the other of which flows through the two rails in multiple, creating corresponding voltages on a vehicle by induction, amplifying such induced voltages, and governing the vehicle jointly by such induced voltages and by the speed of the vehicle.

24. The method of governing railway traffic which consists in supplying to the track rails two alternating currents one of which flows in opposite directions in the two rails and the other of which flows through the two rails in multiple, creating corresponding voltages on a vehicle by induction, and governing the vehicle jointly by such induced voltages and by the speed of the vehicle.

25. The method of governing railway traffic which consists in supplying to the track rails two alternating currents of the same frequency, shifting the phase of one of said currents with relation to the other in accordance with traffic conditions in advance, and governing the vehicle jointly by the phase relation of said currents and by the speed of the vehicle.

26. The method of governing railway traffic which consists in supplying the track rails with two alternating currents of the same frequency, controlling the supply of one current and the phase relation of the two currents according to traffic conditions in advance, and governing the vehicle jointly by the phase relation of said currents and by the presence and absence of said one current and by the speed of the vehicle.

In testimony whereof I affix my signature.

LLOYD V. LEWIS.